United States Patent Office 3,316,293
Patented Apr. 25, 1967

3,316,293
ORGANIC PHOSPHORUS COMPOUNDS
Russell L. K. Carr, Grand Island, N.Y., and Charles F. Baranauckas, Memphis, Tenn., assignors to Hooker Chemical Corporation, Niagara Falls, N.Y., a corporation of New York
No Drawing. Filed July 26, 1965, Ser. No. 475,012
20 Claims. (Cl. 260—500)

This application is a continuation-in-part of our application Ser. No. 40,553, filed July 5, 1960, now abandoned.

This invention relates to organic phosphorus compounds and processes for preparing them. More particularly, this invention relates to the reaction products of yellow phosphorus and organic halides, and techniques for recovering derivatives of these reaction products. Still more particularly, this invention relates to the preparation of organic phosphonium halides, tertiary phosphine oxides, and organic phosphinic acids.

Organic phosphonium halides have been used as antibacterial agents, and as pharmaceutical agents. Tertiary phosphine oxides have been used extensively to improve the thermal stability of organic liquids and silicone rubbers, to improve the color of acrylonitrile polymers, polyester resins and alkyd resins, and to flameproof cellulosic materials.

Metal salts of organic phosphinic acids are used as surface active agents, and esters of organic phosphinic acids have been used as plasticizers.

Numerous attempts have been made to prepare organic phosphorus compounds such as tertiary phosphine oxides by employing elemental phosphorus as a raw material. J. M. Crafts et al., in the Journal of the Chemical Society, volume 24 (1871), page 629, disclose the reaction of phosphorus and ethyl iodine in a sealed tube, at a temperature of one hundred and sixty degrees centigrade, to produce triethyl phosphine oxide. Kosolapoff in Organic Phosphorus Compounds, 1950 edition, pages 108–109, discloses that tertiary phosphine oxides are produced when phosphorus, ethyl iodine and zinc are heated to a temperature above one hundred degrees centigrade, and the resulting product is subjected to "aqueous treatment." Reactions such as these must be carried out in a sealed tube, and are not commercially feasible because of the expensive equipment necessary to effect the reaction and because of the often low product yield.

It is an object of this invention to provide organic phosphorus compounds and processes for preparing them.

Another object of this invention is to provide a novel method of preparing organic phosphonium halides.

A further object of the invention is to provide an improved and more efficient process for the preparation of tertiary phosphine oxides.

Still a further object of the invention is to provide a novel method of preparing tertiary phosphine oxides of high yield and purity.

Another object of the invention is to provide an improved and more efficient process for the preparation of organic phosphinic acids.

Still a further object of the invention is to provide novel catalysts for the preparation of organic phosphorus compounds from yellow phosphorus.

These and other objects of the invention will be apparent from the following detailed description of the invention.

It has now been discovered that organic phosphorus compounds can be prepared in high yield and purity from yellow phosphorus and an organic halide employing certain metallic compositions as a catalyst. In this novel process, yellow phosphorus is admixed with organic halide and catalyst, and the reactants are heated in an inert atmosphere until the reaction is substantially complete. Phosphorus trihalide, which forms during the reaction, can be removed by distillation, if desired.

Organic phosphorus reaction products remaining in the residue may be represented by the general formula:

(I) $\quad (R)_n PX_{(5-n)}$ where R and X are as defined below, and $n$ is a whole number between 1 and 4. These reaction products may be processed by one or more of several embodiments of the invention, depending upon the type of organic phosphorus compound desired. When it is desired to recover organic phosphonium halides, which may be represented by the formula:

(II) $\quad (R)_4 PX$ where R is as defined below, the residue is extracted with a suitable solvent and the organic phosphonium halide is crystallized therefrom. When it is desired to recover tertiary phosphine oxides and organic phosphinic acids, the residue is hydrolyzed in an aqueous alkaline solution, and the resulting slurry is then subjected to a solids-liquid separation step, such as filtration, to separate the solid and liquid phases. The solid phase, which is the tertiary phosphine oxide product, may be further purified if desired, as described more fully below. The liquid phase may be acidified if desired to yield an organic phosphinic acid.

The term "organic halide" as used throughout the description and claims is intended to include aryl substituted allyl halides, benzyl halides, alkyl-substituted benzyl halides, alkenyl-substituted benzyl halides, alkynyl-substituted benzyl halides, alicyclic-substituted benzyl halides, alpha-haloalkyl derivatives of fused ring hydrocarbons, alpha-haloalkyl derivatives of compounds having hydrocarbon rings directly united, alpha-haloalkyl derivatives of cyclic compounds having at least one element other than carbon in the ring, alpha-haloalkyl derivatives of cyclic hydrocarbons having inorganic substituents, such as tin, phosphorus and silicon, and mixtures thereof. The term "halide," when used with the term "organic" throughout the description and claims includes chlorine, bromine and fluorine, and mixtures thereof.

Typical examples of suitable aryl substituted allyl halides include cinnamyl chloride, cinnamyl bromide, 1-(p-butylphenyl)-2-methyl-3 chloropropene and mixtures thereof.

Typical examples of suitable benzyl and substituted benzyl halides include benzyl chloride, benzyl bromide, benzyl fluoride, p-methyl benzyl chloride, m-isopropyl benzyl chloride, 3,5-dihexylbenzyl bromide, o-methylbenzyl chloride, 2-methyl-4-nonylbenzyl chloride, 3-isopropenyl benzyl chloride, 1-(4-chloromethylphenyl)-3-hexyne, 1-(3-chloromethylphenyl)-4-octyne, 3,4,5-trimethyl benzyl chloride, 3-methyl-4-ethyl-5-propyl benzyl chloride, p-iodobenzyl chloride, dibenzyl-4 chlorobenzylboron, and mixtures thereof. Typical examples of suitable alpha-haloalkyl derivatives of fused ring hydrocarbons include α-chloromethyl naphthalene, 2-chloromethyl-1-methyl anthracene, 1-bromomethyl-5-chlorophenanthrene, 1-chloromethyl fluorene, 4-chloromethyl indene, 4-chloromethyl-2,3-dimethylindane, 4'-chloromethylspiro(cyclohexane-1, 1'-indene), and mixtures thereof.

Typical examples of suitable alpha-haloalkyl derivatives of compounds having hydrocarbon rings directly united include 3-(1-cyclohexenyl)benzyl chloride, 4-(3-methylcyclohexyl) benzyl chloride, 3-chloromethyl-3',4'-dimethyldiphenyl, 4-chloromethyl-4'-ethyl-Δ2,2'-biindan, 2-bromomethyl-9,9'-bifluorene, 2'-chloromethyl-2,6''-dimethyl-m-terphenyl, 4-chloromethyl-p-quaterphenyl, 2'-bromo-2,6''-dicarbethoxy-m-terphenyl and mixtures thereof.

Typical examples of suitable alpha-haloalkyl derivatives of cyclic compounds having at least one element other than carbon in the ring include 4-chloromethylpyridine, 3-bromomethyl-5-propyl pyridine, 5-chloromethylisoquinoline, 7-bromomethyl-5-ethyl isoquinoline, 5-chloroethyl-8-methyl-1(H),2-benzopyran, 5-chloromethylpyrimidine, 4-carbethoxy-6-chloromethylbenzothiophen, 4-chloro-2,6-dicyanopyridine, and mixtures thereof.

Typical examples of suitable alpha-haloalkyl derivatives of cyclic hydrocarbons having inorganic substituents such as tin, phosphorus and silicon include 4-chloromethylphenyl triphenyl tin, 4-chloromethyl-2-trifluoromethylphenyl triphenyl tin, trimethyl chlorosilane, 4-chloromethylphenyl triphenyl silane, 4 - chloromethyl phenyl dimethyl stibine, 4-bromomethyl-2-methoxyphenyl diphenyl phosphine oxide and mixtures thereof.

As can be seen from the foregoing discussion of the organic halides, R of Formula I represents aryl substituted allyl, benzyl, alkyl-substituted benzyl, alkenyl-substituted benzyl, alkynyl-substituted benzyl, alicyclic-substituted benzyl, alkyl derivatives of fused ring hydrocarbons, alkyl derivatives of compounds having hydrocarbon rings directly united, alkyl derivatives of cyclic compounds having at least one element other than carbon in the ring, and alkyl derivatives of cyclic hydrocarbons having inorganic substituents such as tin, phosphorus, and silicon. In Formula I, X represents chlorine, bromine and fluorine. The terms "alkyl," "alkenyl," "alkynyl" and "alicyclic," refer to the lower members of the series, such as those having between about one and about 10 carbon atoms. The term "aryl" refers to those of the series having between six and ten carbon atoms. The terms "ring" and "cyclic" refer to compounds having between three and thirty carbon atoms.

When benzyl chlorides are employed in admixture with organic compounds having poly(halomethyl) groups it is possible to obtain products having two or more phosphorus atoms in one molecule. Typical of structures that might be obtained are:

(III)

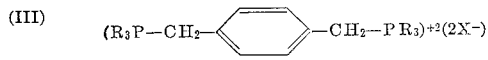

(IV)

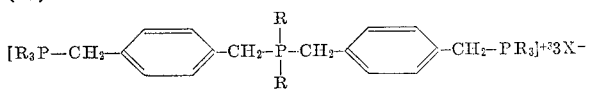

where R and X are as defined above.

Yellow phosphorus, which is sometimes referred to as "white" phosphorus, is preferably employed as the phosphorus reactant. However, any form of phosphorus which is converted to yellow phosphorus under the reaction conditions obtained, may be employed. Commercial red phosphorus does not appear to react satisfactorily. However, when the reaction is carried out with yellow phosphorus in an amount in excess of about one gram-atom of phosphorus per gram-mole of organic halide the phosphorus in excess of that which reacts with the organic halide is converted into a form of phosphorus having the appearance of red phosphorus and designated "red" phosphorus. This type of "red" phosphorus readily reacts with organic halides to yield the desired organic phosphorus compounds. Yellow phosphorus is preferably reacted with the organic halide in molten form, but phosphorus may be added to the reaction vessel in solid form if desired, since the solid phosphorus is converted to molten form under the reaction conditions obtained. The organic halide and phosphorus are reacted in a molar ratio of between about 2:1 and about 60:1, and preferably between about 8:1 and about 48:1 moles of organic halide per mole of $P_4$; proportions in excess of these ratios may be employed particularly if the organic halide is used as the solvent as well as a reactant.

A suitable metal or metal compound catalyst is necessary to effect the reaction between the organic halide and phosphorus. Suitable metals having a catalytic effect when added in effective catalytic proportions to the reaction mixture include copper, palladium, cobalt, nickel, silver, rhodium and mixtures thereof. While we do not wish to be limited by theory, it is believed that at least some of these metals react with a portion of the phosphorus in the reaction mixture to yield the corresponding metal phosphide or other metal phosphorus compound. Typical examples of suitable compounds of the aforesaid metals which may be employed as a catalyst include those compounds in which the anionic part does not interfere with the reaction and in which the cationic part serves as the catalytic agent such as chlorides, bromides, fluorides, sulfates, phosphates, phosphides and the like. Effective catalytic proportions of the aforesaid metals and metal compounds are between about .2 and about 125, and preferably between about 1 and about 20 percent by weight of the elemental phosphorus employed in the reaction.

If desired, the aforesaid reactants and catalyst may be admixed with a suitable solvent having a boiling point above about one hundred and fifty degrees centigrade. Typical examples of suitable solvents include decalin, tetralin, dibutylcarbitol, diethylcellusolve, diphenylether and mixtures thereof. If desired, an excess of the organic halide may be employed as the solvent.

Phosphorus, organic halide and catalyst in the aforesaid proportions, with or without solvent, are heated in a reaction vessel provided with agitation means and refluxing means. An inert atmosphere such as nitrogen, argon or the like, is maintained in the reaction system. An oxidizing atmosphere such as air or oxygen should be avoided to prevent burning of the phosphorus. The reaction mixture is heated to a temperature between about one hundred degrees centigrade and one hundred and ninety five degrees centigrade, and preferably between about one hundred and thirty degrees centigrade and about one hundred and ninety degrees centigrade, under total refluxing conditions, until the reaction is substantially complete. Maintaining the reaction mixture within the aforesaid temperature range for a period of between about 0.5 and fifty hours, and preferably between about one and about fifteen hours is sufficient to effect substantial completion of the reaction.

The pressure employed during the reaction is not critical and may range from subatmospheric to superatmospheric pressure.

After completion of the reaction, phosphorus trihalides may be removed from the reaction mixture if convenient and desirable, for example, by distillation. The solvent and/or excess reactant organic halide may be similarly removed by distillation, for example at reduced pressure, during which process the phosphorus trihalide may also be largely removed; organic halide removed in this manner may be recycled as a reactant. If deemed more preferable the original reaction mixture may be cooled to a temperature below room temperature and filtered and the filtrate either concentrated further by distillation and/or hydrolyzed in a manner similar to that described below for the solid reaction product. The solid reaction product (the distillation residue or the solid removed by filtration) which is believed to consist in a large part of organic phosphorus halides of the type represented by Formula I, is then processed or treated according to at least one of several embodiments of the invention, depending upon the type of organic phosphorus compound desired. When it is desired to recover quaternary phosphonium halides of the type represented by Formula II, the distillation residue is admixed with a solvent capable of dissolving the quaternary phosphonium halide, such as water or lower alcohols such as methanol, ethanol, propanol, butanol and mixtures thereof. The resulting slurry is filtered, and the quaternary phosphonium halide is crystallized from the liquid phase by conventional crystallization techniques.

When it is desired to recover tertiary phosphine oxides and/or organic phosphinic acids from the reaction product, the latter is hydrolyzed by admixing with a dilute aqueous solution of a strong base such as sodium hydroxide, potassium hydroxide, sodium carbonate, potassium carbonate and the like. Strong organic bases such as guanidine, tetraphenylguanidine, and other quaternary bases may be employed if desired. The concentration of the base in the aqueous solution may be between about one and about twenty-five percent by weight, but any concentration capable of effecting hydrolysis of the reaction product may be employed. Hydrolysis is preferably effected by vigorously agitating the material in the basic solution at a temperature between about room temperature and about one hundred and ten degrees centigrade, for a period of between about one and about four hours. Tertiary phosphine oxide, which is present in the hydrolysis reaction mixture as a solid, is separated from the basic liquid phase residue by any suitable solids-liquid separation technique, such as by filtering, centrifuging and the like. The solid product may be employed in its crude form, if desired, but is preferably further purified to remove basic solution and catalyst present as impurities.

Purification of the crude solid tertiary phosphine oxide is effected by admixing the solid with a dilute aqueous solution of a strong acid to neutralize any basic solution adhering to the solid and to help dissolve any catalyst that may be contained in the solid. Typical examples of suitable strong acids include sulfuric acid, hydrochloric acid hydrobromic acid, hydrofluoric acid, nitric acid, chloric acid, nitrobenzoic acid, chlorobenzoic acid, bromobenzoic acid, chlorendic acid, phthalic acid, isophthalic acid, glutaric acid, trifluoroacetic acid, hexafluoroglutaric acid and the like. The mixture of crude solid tertiary phosphine oxide and acid solution is agitated under temperature and time conditions similar to those employed in the hydrolysis step, and then subjected to a solid-liquid operation step such as filtration. If desired, the resulting purified solid tertiary phosphine oxide may be further purified by dissolving in a suitable solvent such as benzene, ethanol, methanol, toluene and the like, and recrystallizing therefrom. The solid tertiary phosphine oxide, either with or without the recrystallization step, may be employed as a chemical reagent as discussed above.

The liquid phase separated from the hydrolysis step may be further processed to produce organic phosphinic acid. This liquid phase also may be described as the basic liquid residue. In this technique a substantial excess of an aqueous solution of a strong acid such as prepared from the strong acids defined above, is admixed with the liquid phase at any convenient temperature and during any convenient period of time. During this reaction the organic phosphinic acid precipitates as a solid, which is separated by any suitable solid-liquid separation means, such as filtering or centrifuging. Organic phosphinic acids produced in this embodiment may then be employed as a chemical intermediate in the preparation of metal salts and esters of the acids described above.

If desired the reaction product may be separated into a liquid phase and solid phase, and the solid phase is dissolved in a solvent for quaternary phosphonium halide. By a series of successive evaporation, cooling, and solid-liquid separation steps, solid quaternary phosphonium halide is recovered. The resulting liquid phase is combined with the reaction product liquid phase and the combined solution is further processed by hydrolysis and acidification as described above to yield tertiary phosphine oxide and organic phosphinic acid.

The following examples are presented to define the invention more fully without any intent of being limited thereby. All parts and percentages are by weight unless otherwise specified.

*Example 1*

Tetrabenzyl phosphonium chlorine was prepared from benzyl chloride and yellow phosphorus, employing a cuprous chloride catalyst, and thereafter hydrolyzed to yield tribenzylphosphine oxide in accordance with the following procedure.

A fixe liter flask having four openings in the top was employed in this reaction. A motor driven stirrer passed through one opening, an inlet for nitrogen passed through the second opening, a reflux condenser was attached to the third opening and a thermometer passed through the fourth. The reflux condenser was connected to a Dry Ice trap. Fifteen hundred grams (11.86 moles), of benzyl chloride, and one hundred and twenty grams (3.87 gram atoms) of yellow phosphorus, nineteen grams (0.19 moles) of cuprous chloride, and one thousand milliliters of decalin were added to the flask. Nitrogen was passed through the flask and out the condenser to the Dry Ice trap during the reaction. The mixture was heated to a temperature between about one hundred and seventy and about one hundred and eighty degrees centigrade with constant stirring for eleven hours and forty minutes, while maintaining constant reflux. At the end of this period, reflux was discontinued, and vapor was collected at atmospheric pressure to a vapor phase temperature of about one hundred and seventy-seven degrees centigrade. This distillate contained substantially all of the phosphorus trichloride in the reaction product that could be isolated by conventional methods of fractionation and distillation. The distillation residue was cooled, filtered, and the resulting solid was then washed with carbon tetrachloride and dried. The dry solid weighed nine hundred and eighty grams. Tetrabenzyl phosphonium chloride was identified in the crude reaction product mixture in the following manner. The solid mixture (ten grams), was extracted with three portions of hot water, the filtrates were combined and cooled, and the white solid (3.5 grams) was removed by filtration. Recrystallization from water gave a material having a melting point of 223.5 to 226 degrees centigrade (uncorr.). The literature reports the melting point for $(C_6H_5CH_2)_4PCl \cdot 2H_2O$ as 224 degrees centigrade (Letts, E. A. and Collie, N. Trans. Roy. Soc. Edinburgh 30 181 (1882), and 228 degrees centigrade (Kosolapoff, G. Organophosphorus Compounds, Wiley 1950, p. 86). As further substantiation, the material was synthesized in the following way. Phosphorus trichloride (twelve grams, 0.09 moles), in anhydrous ethyl ether (one hundred milliliters) was added to benzyl magnesium chloride (about 0.33 moles in about two hundred and thirty milliliters anhydrous ether) (see Org. Syn. vol. I, p. 471), with stirring and cooling, and, after refluxing for one-half an hour, the resulting mixture was hydrolyzed with a saturated aqueous solution of ammonium chloride. One-half of this solution was filtered under nitrogen by forcing the solution through a tube containing a glass wool plug into another flask containing benzyl chloride (six grams), and anhydrous ether. Oxygen-free toluene (one hundred milliliter), was added, ether was removed by distillation and the mixture was refluxed (still under nitrogen) for three hours and cooled and the solid (eleven grams), removed by filtration. Recrystallization from water gave a material having a melting point of 225.5 to 226 degrees centigrade (uncorrected).

Elementary analysis.—Found: percent carbon=72.55, percent hydrogen=6.96. Calculated for

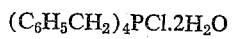

$$(C_6H_5CH_2)_4PCl \cdot 2H_2O$$

percent carbon=72.10, percent hydrogen=6.87. The mixed melting point of this material and that extracted from the product mixture showed no depression; furthermore, the infrared spectra were identical.

Further insight into the nature of the crude reaction product obtained by reaction of benzyl chloride and phosphorus was gained in the following way. Recrystallization of the crude mixture from acetone yielded a mixture of orange and yellow crystals. These were mechanically separated (a la Pasteur); the orange crystals appeared to be substantially crude tetrabenzyl phosphonium chloride as indicated by a comparison of their infrared spectra. The yellow crystals had an infrared spectrum very similar to that of material having the composition $(C_6H_5CH_2)_3P=O.HCl$ which was prepared as follows: The other half of the tribenzyl phosphine-ether solution (remaining from the preparation of tetrabenzyl phosphonium chloride) was filtered under nitrogen into another flask and treated with fresh, dry chlorine in an attempt to produce $(C_6H_5CH_2)_3PCl_2$ The resulting solid was filtered quickly in air, washed with dry benzene and ether and dried in a vacuum desiccator. The solid had a melting point of one hundred and seventy to one hundred and seventy-two degrees centigrade by the sealed tube method, and had the following elementary analysis: percent carbon=71.21, percent hydrogen=6.16, percent chlorine=10.00, percent phosphorus=8.31, percent oxygen (by difference)=4.32. Calculated analyses for $C_{21}H_{22}ClOP$: percent carbon=70.7, percent hydrogen =6.17, percent chlorine=9.95, percent phosphorus=8.7, percent oxygen=4.48.

It became evident during the examination of the crude product mixture that various copper containing complexes were also present. Hydrolysis of the solid was effected in an aqueous solution of ten percent sodium hydroxide and separated. Acidification of the basic filtrate led to the recovery of a small amount (less than five percent), of acidic material which appears to be dibenzyl phosphonic acid, having a melting point of 191.5 to 192 degrees centigrade (Kosolapoff, G. loc cit., see Example 10, shows a melting point of one hundred and ninety-one degrees to one hundred and ninety-two degrees centigrade).

The solid hydrolysis product was separated from the solution and then admixed with an aqueous solution of ten percent $H_2SO_4$ to complete hydrolysis and to remove copper compounds. The solids were then separated from the aqueous solution and dried. Tribenzyl phosphine oxide product was obtained in a yield of about fifty-five percent, based upon the elemental phosphorus used.

During various similar reactions of which this is but one example, hydrolyses were effected for varying lengths of time. These variations resulted in the isolation of products whose properties were not inconsistent with $(C_6H_5CH_2)_4P^+OH^-$ and $(C_6H_5CH_2)_4P^+HSO_4^-$.

*Example 2*

The procedure of Example 1 was repeated on a smaller scale with yellow phosphorus (six grams, 0.19 mole); benzyl chloride (seventy-four grams, 0.5 mole) and decalin (50 ml.) with metallic copper, employed as the catalyst. The yield of tribenzyl phosphine oxide in this example was about similar to that of Example 1.

*Example 3*

The procedure of Example 2 was repeated employing 3,4-dichlorobenzylchloride rather than benzylchloride as the organic halide. The tris(3,4-dichlorobenzyl)phosphine oxide was produced in a yield of about twenty-four percent.

Elementary analysis.—Calculated for $C_{21}H_{15}Cl_6OP$: percent carbon=47.85, percent hydrogen=2.87. Found: percent carbon=48.19, percent hydrogen=2.83.

*Example 4*

The procedure of Example 2 was repeated employing o-chlorobenzylchloride rather than benzyl chloride as the organic halide reactant and tris(o-chlorobenzyl) phosphine oxide was isolated. After recrystallization from benzene an elementary analysis yielded percent carbon =64.47, percent hydrogen=4.65. Calculated for analysis $C_{21}H_{18}Cl_3OP.C_6H_6$: percent carbon=64.62, percent hydrogen=4.79.

*Example 5*

The procedure of Example 2 was repeated employing p-chlorobenzylchloride rather than benzyl chloride as the organic halide reactant, and tris(p-chlorobenzyl) phosphine oxide was produced. Elementary analysis yielded: percent carbon=59.68; percent hydrogen=4.29. Calculated for $C_{21}H_{18}Cl_3OP$: percent carbon=59.52, percent hydrogen=4.28.

*Example 6*

The procedure of Example 2 was repeated employing p-methylbenzylchloride instead of benzylchloride as the organic halide reactant and tris(p-methylbenzyl) phosphine oxide was produced in a yield of forty-nine percent.

Elementary analysis.—Found: percent carbon=79.46, percent hydrogen=7.21. Calculated for $C_{24}H_{27}OP$: percent carbon=79.58, percent hydrogen=7.51.

*Example 7*

The procedure of Example 2 was employed with dry palladium (II) chloride (one gram) as the catalyst, and benzyl chloride (sixty-four grams, 0.5 mole); no other solvent was used. After about forty-one hours all the phosphorus had reacted and tribenzyl phosphine oxide was isolated after hydrolysis of the crude reaction product.

*Example 8*

The procedure of Example 7 was repeated in the absence of any catalyst. After about fifty hours at one hundred and seventy to one hundred and eighty degrees centigrade much unreacted phosphorus remained; after hydrolysis of this reaction mixture the presence of no organophosphorus compounds could be detected in the resulting mixture.

*Example 9*

The procedure of Example 2 was repeated with 1,4-bis chloromethyl benzene, and cuprous chloride as the catalyst. After forty-four hours at one hundred and sixty to one hundred and seventy degrees centigrade the mixture was hydrolyzed and there was isolated a hard, red powder, which burned in a flame but was self-extinguishing when removed from the flame. These results are consistent with the formation of an organophosphorus polymer.

*Example 10*

One pound of crude reaction product from reaction of benzyl chloride and phosphrous was hydrolyzed at reflux with aqueous base (one thousand milliliters of ten percent NaOH) for two hours and filtered. The filtrate was cooled, acidified and refiltered to give ten grams of white solid M.P.=190–1 degrees centigrade (reported for $(C_6H_5CH_2)_2POOH$: one hundred and ninety-one degrees centigrade, one hundred and ninety-two degrees centigrade; Kosolopoff, G., Organophosphorus Compounds, Wiley, 1950) which was found to contain 12.5 percent P; calculated for $C_{14}H_{15}O_2P$, 12.4 percent P. Subsequent purification by recrystallization of collected samples of this product led to material M.P. 191–191.5 degrees centigrade and having a neutralization equivalent of two hundred and forty-four (average of three); theory requires that $(C_6H_5CH_2)_2POOH$ have a neutralization equivalent of two hundred and forty-six.

*Example 11*

Phosphorus (6.1 grams), benzyl chloride (73.9 grams), and cuprous chloride (2.0 grams) were reacted together at one hundred and sixty-nine degrees centigrade in a solvent of twenty-five milliliters of tetrahydronaphthalene and twenty-five milliliters of dibutyl carbitol for fifty hours. The reaction mixture was cooled and filtered and the solid was digested with two hundred and fifty milliliters of ten percent aqueous NaOH for three hours, cooled and filtered. Acidification of the filtrate produced 18.5 grams of white solid which was like that produced in Example 10. The conversion of dibenzyl phosphinic acid was about forty-five to fifty percent. The solid remaining from the prior filtration ultimately gave tribenzylphosphine oxide in about forty-five to fifty percent conversion.

*Example 12*

Phosphorus (9.0 grams), benzyl chloride (73.9 grams), and cuprous chloride (3.76 grams) reacted as in Example 11 at one hundred and fifty degrees centigrade in fifty milliliters of tetrahydronaphthalene and the product mixture treated as in Example 11 gave dibenzyl phosphinic acid in about a four percent conversion based on phosphorus; the conversion to tribenzyl phosphine oxide was about fifty-three percent.

*Example 13*

Phosphorus (3.1 grams), benzyl chloride (73.9 grams) and cuprous chloride (0.26 gram) at one hundred and eighty-eight degrees centigrade in dibutyl carbitol, as in Example 11 gave dibenzylphosphinic acid in a thirty to thirty-six percent conversion.

*Example 14*

The procedure of Example 2 was employed with benzyl chloride (thirty-seven grams, 0.29 mole), yellow phosphorus (three grams, 0.097 gram-atoms) and anhydrous cobaltous chloride (one gram, 0.083 mole) in tetralin (twenty-five milliliters). After more than thirty-eight hours at temperatures below two hundred degrees centigrade the reaction mixture was hydrolyzed. Dibenzyl phosphinic acid was identified among the products.

*Example 15*

Benzyl chloride (74.6 grams, 0.59 moles), yellow phosphorus (six grams, 0.19 gram-atoms), silver chloride (two grams), and tetrahydronaphthalene (fifty milliliters) were heated together under nitrogen at one hundred and ninety to one hundred and ninety-five degrees centigrade for about forty-eight hours as in previous examples and cooled and filtered to give 58.5 grams of crude reaction product. Part of this was dissolved in acetone and methanol and filtered; evaporation of the solvents led to the recovery of tetrabenzylphosphonium chloride. Hydrolysis of part of the crude product resulted in the formation of tribenzylphosphine oxide in a conversion in excess of about sixty percent.

*Example 16*

Benzyl chloride (seventy-four grams, 0.59 moles), yellow phosphorus (six grams, 0.19 gram-atoms), tetrahydronaphthalene (fifty milliliters) and nickel metal (two grams) were reacted at one hundred and eighty to one hundred and ninety degrees centigrade under $N_2$ for forty-two hours to give about forty grams of crude reaction mixture. Hydrolysis of this as in previous examples has also given tribenzylphosphine oxide.

*Example 17*

Benzyl chloride (seventy-four grams, 0.59 moles), commercial amorphous red phosphorus (six grams, 0.19 gram-atoms), cuprous chloride (two grams), and tetrahydronaphthalene (fifty milliliters) were contacted as in previous examples at one hundred and eighty-five to one hundred and ninety degrees centigrade for twenty-two and one-half hours after first drying the red phosphorus by distilling off thirty milliliters of tetrahydronaphthalene from a stirred mixture of the phosphorus and eighty milliliters of solvent. Hydrogen chloride evolution was pronounced throughout the reaction, about eighty-five to ninety percent of the red phosphorus was recovered unchanged except for possible reaction with the cuprous chloride and a trace of dibenzylphosphinic acid was isolated as the only organophosphorus compound detected.

*Example 18*

Benzyl chloride (74.4 grams, 0.59 moles), yellow phosphorus (six grams, 0.19 gram-atoms), zinc, granular twenty mesh, assay one hundred percent (1.1 grams) and tetrahydronaphthalene (fifty milliliters) were contacted as in previous examples at one hundred and seventy to one hundred and eighty-five degrees centigrade for more than thirty hours. Hydrogen chloride evolution was copious and much unreacted yellow phosphorus remained at the end of this time. Hydrolysis yielded no organophosphorus compounds, only Friedel-Crafts type substitution products were observed.

*Example 19*

Benzyl chloride (73.6 grams, 0.58 moles), yellow phosphorus (three grams, 0.097 gram-atoms), tetrahydronaphthalene (fifty milliliters), and zinc dust, assay 97.1 percent (3.75 grams) were reacted for thirty hours at one hundred and ninety to two hundred degrees centigrade. Again much unreacted yellow phosphorus remained, copious hydrogen chloride evolution occurred and only Friedel-Crafts type substitution products were observed as reaction products of the organic starting material.

*Example 20*

Benzyl chloride (64.5 grams, 0.51 mole), yellow phosphorus (three grams, 0.097 gram-atoms) and anhydrous rhodium chloride (0.5 gram) were reacted together at one hundred and sixty to one hundred and seventy degrees centigrade under a cover of nitrogen for more than forty-three hours and the mixture hydrolyzed. Tribenzylphosphine oxide was isolated from the hydrolysis mixture.

*Example 21*

Benzyl chloride (37.0 grams, 0.29 moles), yellow phosphorus (nine grams, 0.29 gram-atoms), tetralin (twenty-five milliliters) and cuprous chloride (one gram) were reacted as in previous examples. When all evidence indicated the absence of unreacted yellow phosphorus an aliquot sample was removed and digested successively with hot acetone and methanol and filtered to yield an insoluble residue. This was present in an amount which corresponds approximately to the phosphorus present in excess of one atom of phosphorus for each two molecules of benzyl chloride (plus at least some of the added copper). (Other experiments had given parallel results and in these, this material had the appearance of a variety of "red" phosphorus containing copper.) Additional benzyl chloride (thirty grams) and tetralin (twenty milliliters) were then added to the reaction mixture and heating at near one hundred and ninety degrees centigrade was continued for about twenty-seven hours. At the end of this time the entire mixture was digested with hot acetone and methanol and filtered; only a trace (0.05 grams) of insoluble material was found. Tribenzylphosphine oxide was isolated after hydrolysis of the reaction mixture.

*Example 22*

Benzyl chloride and yellow phosphorus, the latter in excess of one gram-atom of phosphorus to two gram-moles of benzyl chloride were reacted as in Example 21 and the insoluble material resembling red phosphorus in appearance was isolated and dried. This latter "red" phosphorus (three grams), benzyl chloride (thirty-seven grams, 0.29 moles), cuprous chloride (one gram, 0.01 moles) and tetralin (twenty-five milliliters) were reacted together at temperatures near one hundred and eighty to one hundred and ninety degrees centigrade for twenty-seven hours. Filtration resulted in the recovery of no insolubles. Treatment of the reaction mixture with ethanol led to the isolation of material having an infrared spectrum like that of tetrabenzylphosphonium chloride and subsequent hydrolysis of another part of the product led to the isolation of tribenzylphosphine oxide.

*Example 23*

Cinnamyl chloride (32.4 grams, 0.21 moles), yellow phosphorus (three grams, 0.097 gram-atoms), cuprous chloride (one gram) and tetralin (twenty-five milliliters) were reacted as in previous examples at temperatures below one hundred and fifty degrees centigrade. When all the yellow phosphorus was consumed (after forty-three hours) the mixture was hydrolyzed and there was isolated material soluble in organic solvents and containing 8.5 percent of combined phosphorus as indicated by elemental analysis, thus indicating that organophosphorus compounds had been produced.

*Example 24*

The procedure of Example 14 was used with a copper phosphide (1.3 grams), assaying 72.7 percent copper and 24.4 percent phosphorus, as the catalyst and with decalin as the solvent. Subsequent hydrolysis of the resulting reaction product led to the recovery of tribenzylphosphine oxide.

*Example 25*

The procedure of Example 24 was followed with cupric chloride (0.6 grams) as the catalyst. This also led to the recovery of tribenzylphosphine oxide.

It will be recognized by those skilled in the art that various modifications within the invention are possible, some of which have been referred to above. Therefore, we do not wish to be limited except as defined by the appended claims.

What is claimed is:
1. A process for preparing quaternary phosphonium halides, which comprises heating at reflux temperatures a mixture of yellow phosphorus and an organic halide selected from the group consisting of benzyl halides, alkylstituted benzyl halides, o-chlorobenzyl chloride, p-chlorohalides, alkynyl-substituted benzyl halides, alicyclic-substituted benzyl halides o-chlorobendyl chloride, p-chlorobenzyl chloride, p-iodobenzyl chloride, 3,4-dichlorobenzyl chloride and 1,4-bis-chloromethylbenzene, and mixtures thereof, wherein the halogen is selected from the group consisting of fluorine, chlorine, and bromine, in the presence of between about 0.2 and about 125 percent, by weight of yellow phosphorus, of a catalyst selected from the group consisting of copper, palladium, cobalt, nickel, silver, rhodium, the chlorides, bromides, fluorides, sulfates, phosphates, phosphides of these metals and mixtures thereof, in an inert atmosphere, separating the resulting solid phase reaction product, treating said reaction product with a solvent for quaternary phosphonium halide, and recovering the desired quaternary phosphonium halide.

2. A process according to claim 1 wherein the quaternary phosphonium halide is crystallized from the solvent, and the resulting crystals are recovered predominantly as quaternary phosphonium halide.

3. A process according to claim 1 wherein the reflux temperature is between about one hundred and one hundred and ninety-five degrees centigrade.

4. A process according to claim 1 wherein said organic halide is reacted with said yellow phosphorus in a molar ratio of between about 2:1 and 60:1 moles of said organic halide to said yellow phosphorus.

5. A process according to claim 1 wherein the organic halide is benzyl halide.

6. A process according to claim 1 wherein the organic halide is substituted benzyl halide.

7. A process for preparing tertiary phosphine oxides, which comprises heating at reflux temperatures a mixture of yellow phosphorus and an organic halide selected from the group consisting of benzyl halides, alkyl-substituted benzyl halides, alkenyl-substituted benzyl halides, alkynyl-substituted benzyl halides, alicyclic-substituted benzyl halides, o-chlorobenzyl chloride, p-chlorobenzyl chloride, p-iodobenzyl chloride, 3,4-dichlorobenzyl chloride and 1,4-bis-chloromethyl benzene, and mixtures thereof, wherein the halogen is selected from the group consisting of fluorine, chlorine, and bromine, in the presence of between about 0.2 and about 125 percent, by weight of yellow phosphorus, of a catalyst selected from the group consisting of copper, palladium, cobalt, nickel, silver, rhodium, the chlorides, bromides, fluorides, sulfates, phosphates, phosphides of these metals and mixtures thereof in the inert atmosphere, separating the resulting solid phase reaction product, treating said reaction product with a base, whereby the desired phosphine oxide is formed, and thereafter recovering said phosphine oxide.

8. A process according to claim 7 wherein treating the resulting reaction product comprises hydrolyzing with an aqueous alkaline solution.

9. A process according to claim 7 wherein the reflux temperature is between about one hundred and one hundred and ninety-five degrees centigrade.

10. A process according to claim 7 wherein said organic halide is reacted with said yellow phosphorus in a molar ratio of between about 2:1 and about 60:1 moles of said organic halide to said yellow phosphorus.

11. A process according to claim 7 wherein the organic halide is benzyl halide.

12. A process according to claim 7 wherein the organic halide is substituted benzyl halide.

13. A process for preparing organic phosphinic acids which comprises heating at reflux temperatures a mixture of yellow phosphorus and an organic halide selected from the group consisting of benzyl halides, alkyl-substituted benzyl halides, alkenyl-substituted benzyl halides, alkynyl-substituted benzyl halides, alicyclic-substituted benzyl halides, and mixtures thereof, wherein the halogen is selected from the group consisting of fluorine, chlorine and bromine, in the presence of between about 0.2 and about 125, by weight of yellow phosphorus, of a catalyst selected from the group consisting of copper, palladium, cobalt, nickel, silver, rhodium, the chlorides, bromides, fluorides, sulfates, phosphates, phosphides of these metals and mixtures thereof, in an inert atmosphere, separating the resultant solid phase reaction product, treating said reaction product with a base, separating the resultant basic liquid residue, treating said basic liquid residue with a strong aqueous acid solution, and thereafter recovering the desired solid organic phosphinic acid from the resulting acid slurry.

14. A process according to claim 13 wherein the reflux temperature is between about one hundred and one hundred and ninety-five degrees centigrade.

15. A process according to claim 13 wherein said organic halide is reacted with said yellow phosphorus in a molar ratio of between about 2:1 and about 60:1 moles of said organic halide to said yellow phosphorus.

16. A process according to claim 13 wherein the organic halide is benzyl halide.

17. A process according to claim 13 wherein the organic halide is substituted benzyl halide.

18. The process for preparing benzyl phosphonium chloride which comprises heating at reflux temperatures a mixture of yellow phosphorus and benzyl chloride in the presence of between about 0.2 and about 125 percent, by weight of yellow phosphorus, of cuprous chloride, in an inert atmosphere, whereby a solid phase reaction product is formed, separating the solid phase reaction product from the reaction mixture, admixing a solvent for benzyl phosphonium chloride with said reaction product, and crystallizing from said solvent predominantly benzyl phosphonium chloride.

19. The process for preparing tribenzyl phosphine oxide which comprises heating at reflux temperatures a mixture of yellow phosphorus and benzyl chloride, in the presence of between about 0.2 and about 125, by weight of yellow phosphorus, of cuprous chloride, in an inert atmosphere, admixing the resulting reaction product with an aqueous alkaline solution, whereby tribenzyl phosphine oxide is precipitated, separating the solid tribenzyl phosphine oxide from the resulting slurry.

20. The process for preparing dibenzyl phosphinic acid which comprises heating at reflux temperatures a mixture of yellow phosphorus and benzyl chloride, in the presence of between about 0.2 and about 125 percent, by weight of yellow phosphorus, of cuprous chloride, in an inert atmosphere, admixing the resulting reaction product with an aqueous alkaline solution, separating the resulting liquid phase, acidifying said liquid phase with a strong aqueous acid solution, and thereafter recovering dibenzyl phosphinic acid.

References Cited by the Examiner

UNITED STATES PATENTS 3,057,917  10/1962  Maier _____ 260—543

OTHER REFERENCES

Crafts et al.: "J. Chem. Soc.," vol. 24, 1871, p. 629.

Kosolapoff: "Organophosphorus Compounds," 1950, pp. 108–110, 80, 81, 138.

Maier: "Angew. Chem., vol. 71, 1959, pp. 574–5.

LEON ZITVER, *Primary Examiner.*

J. EVANS, *Assistant Examiner*

UNITED STATES PATENT OFFICE
CERTIFICATE OF CORRECTION

Patent No. 3,316,293                             April 25, 1967

Russell L. K. Carr et al.

It is certified that error appears in the above identified patent and that said Letters Patent are hereby corrected as shown below:

Column 6, line 2, for "chlorine" read -- chloride --; line 7, for "fixe" read -- five --; line 58, for "milliliter" read -- milliliters --; column 11, lines 40 and 41, strike out "o-chlorobenzyl chloride, p-chlorohalides,"; same column 11, line 42, for "o-chlorobendyl" read -- o-chlorobenzyl --.

Signed and sealed this 24th day of June 1969.

(SEAL)
Attest:

Edward M. Fletcher, Jr.                      WILLIAM E. SCHUYLER, JR.
Attesting Officer                             Commissioner of Patents